United States Patent Office 3,389,964
Patented June 25, 1968

3,389,964
PROCESS FOR PREPARING LOW DENSITY
GRAPHITE STRUCTURES
Franciszek Olstowski, Freeport, Tex., assignor to The
Dow Chemical Company, Midland, Mich., a corporation of Delaware
No Drawing. Filed Apr. 4, 1966, Ser. No. 539,635
8 Claims. (Cl. 23—209.1)

This invention relates to a method of producing relatively low density graphite structures and relates more particularly to a method of preparing relatively low density structures from compressed vermicular graphite wherein such structures have improved thermal properties.

It would be desirable to have a non-brittle graphite structure having a relatively low density and yet possessing a physical strength sufficient to permit the use of such structures as furnace brick, high temperature insulation or other utility requiring low thermal conductivity and the ability to withstand high temperatures.

It has now been discovered that relatively low density graphite structures having low thermal conductivity are prepared by compressing vermicular graphite into a compact having density of at least 40 lbs./ft.$^3$, treating such compact with an intercalating agent and heating the treated compact to a temperature of between about 100° C. and about 500° C. to produce an integral, unitary graphite structure having a density of between about 5 and 25 lbs./ft.$^3$. Structures prepared in this manner have essentially laminar void areas providing such structures with substantially lower thermal conductivity than that possessed by structures of the same density prepared by compressing vermicular graphite directly to such density. Likewise, such structures are deformable and under slight pressure may have a degree of resiliency as well as possessing the characteristics of resistance to high temperature and high temperature oxidation usually possessed by compressed vermicular graphite.

The term "vermicular graphite," as used herein, refers to a low density, particulate, worm-like form of expanded graphite which may be prepared, for example, by introducing an intercalating agent such as fuming nitric acid, fuming sulfuric acid, mixtures of concentrated nitric and sulfuric acids, bromine, ferric chloride, and the like between the laminae of particles of natural flake graphite and expanding such treated graphite by heating. Usually, a temperature of 500° C. or more is required to achieve good expansion, but, under some circumstances, a lower temperature may be employed. Under these conditions, expansion in volume of up to 200 to 400 times usually occurs to produce a particulate, vermicular form of graphite having a density of between about 0.1 lb./ft.$^3$ and 1.0 lb./ft.$^3$ and which is easily deformable and compressible into shaped integral structures.

Compression of such vermicular graphite along a single axis produces a compacted integral structure having a high degree of thermal anisotropy with the anisotropy ratio between the axis of compression and the axis perpendicular to that of compression increasing with increasing pressure. Thermal conductivity will be lowest in the axis of compression and highest in the axis perpendicular to that of compression. Biaxial compression substantially reduces the anisotropy and vermicular graphite compressed isostatically or triaxially possesses little or no anisotropy.

To produce the structures of this invention, vermicular graphite is compressed into a structure or form having a density of at least 40 lbs./ft.$^3$ and preferably at least 60 lbs./ft.$^3$. For most purposes, such compression is preferably uniaxial. However, compression biaxially, triaxially, radially or isostatically may be employed to impart to the structure the desired shape or thermal anisotropy characteristics. Re-expansion of compressed vermicular graphite according to this invention, will occur along the axis or axes of the compression force or forces.

The integral compressed vermicular graphite structure prepared above is then treated with an intercalating agent. In general, the greater the quantity of intercalating agent introduced into the graphite (up to its saturation point) the greater will be the expansion upon heating. Since the compressed vermicular graphite structures being treated are of greater physical dimensions than natural flake graphite, a longer contact time with the intercalating agent is usually required. Essentially complete penetration of the structure depends on the density of the structure, the thickness and the time. Suitable penetration by the intercalating agent may usually be achieved by soaking the graphite compact in such agent for a period of from about 2 to about 30 minutes for a compact of a density up to about 100 lbs./ft.$^3$ and a thickness of about ¼-inch. The rate of penetration may be increased by heating the intercalating agent up to about 100° C. For gaseous intercalating agents, more rapid penetration is achieved by increasing the pressure under which such agent is applied to the compressed graphite.

Suitable intercalating agents for use herein include the known intercalating agents for natural graphite. For example, fuming nitric acid, fuming sulfuric acid, mixtures of concentrated nitric and sulfuric acids, Br$_2$, CrO$_2$Cl$_2$, gaseous FeCl$_3$ and the like may be employed.

After intercalation, the treated graphite compact is heated by any suitable means to a temperature of between about 100° C. and 500° C. preferably between about 200° C. and 400° C. Such heating causes the compact to expand in volume as much as 30 times or more to produce a graphite structure having a relatively low density and low thermal conductivity yet having good physical integrity making it suitable as a furnace lining or insulation or for other high temperature applications.

Thermal expansion of the compacted vermicular graphite produces an integral structure having the same general shape as the original compact but with increased dimensions along the axis or axes of compression.

The following examples are provided to further illustrate the invention but are not to be construed as limiting to the scope thereof.

EXAMPLE 1

A quantity of vermicular graphite having a bulk density of 0.2 lb./ft.$^3$ was uniaxially compressed under a pressure of 8000 p.s.i. into a disc having a thickness of ⁹⁄₁₆-inch, a diameter of 4 inches and a density of 76 lbs./ft.$^3$. The graphite disc was soaked in fuming H$_2$SO$_4$ for about one hour at 23° C. At the end of this time, the disc had swelled to about ⅝-inch in thickness. The acid-treated disc was then placed on a hot plate having a surface temperature of 300° C. and allowed to remain thereon (several minutes) until no further expansion took place. After expansion, the graphite disc had a thickness of about 2¼ inches, a density of 12.6 lbs./ft.$^3$, a thermal conductivity through its thickness of 3.2 B.t.u. inches. By B.t.u. inches is meant B.t.u./hr./ft.$^2$ of cross-section/° F./inch of thickness.

For comparison, another portion of the vermicular graphite was directly compressed into a disc having the same dimensions and having a density of 12.0 lbs./ft.$^3$. The thermal conductivity through the thickness of such disc was found to be 15 B.t.u. inches.

EXAMPLE 2

In the same method of Example 1, another portion of vermicular graphite was compressed into a 4 inch diameter disc having a density of 91 lbs./ft.$^3$ and having a thickness of about ⅛-inch. After soaking for 1 hour in fuming HNO₃ at 23° C., the disc was heated to 300° C. for several minutes and expanded in thickness to about 1½ inches. After expansion the disc had a density of 7.6 lbs./ft.³. The disc was then compressed to a density of 11.0 lbs./ft.³ and found to have a thermal conductivity of 5.5 B.t.u. inches.

Another portion of the vermicular graphite was directly compressed to a disc of the same dimensions and having a density of 10.1 lbs./ft.³. The thermal conductivity of this disc was 15.3 B.t.u. inches.

EXAMPLE 3

In order to demonstrate the difference in density achieved by employing various intercalating agents to partially re-expand a compressed graphite structure, a quantity of vermicular graphite was compressed under a pressure of 2000 p.s.i. to produce a disc 4 inches in diameter, ⅛ inch thick and having a density of 99.2 lbs./ft.³. The disc was cut into 4 equal pieces, the pieces were soaked for ½-hour at 23° C. in different intercalating agents, and were then heated to 320° C. for about 4 or 5 minutes. The densities achieved in the expanded structures are shown in the following tabulation.

| Intercalating Agent | Initial Sample Thickness (in.) | Final Sample Thickness (in.) | Initial Sample Density (lbs./ft.³) | Final Sample Density (lbs./ft.³) |
|---|---|---|---|---|
| Liquid bromine | ⅛ | ⅞ | 99.2 | 14.2 |
| 60 wt. percent HClO₄ | ⅛ | 2¼ | 99.2 | 5.84 |
| Red fuming nitric acid | ⅛ | 2¼ | 99.2 | 5.5 |
| Fuming sulfuric acid | ⅛ | 1 1/16 | 99.2 | 11.7 |

Each of the above samples had a thermal conductivity value less than the value obtained by compressing vermicular graphite directly to the same approximate density.

EXAMPLE 4

Vermicular graphite having an apparent bulk density of about 0.3 lb./ft.³ was compressed uniaxially to a density of about 43 lbs./ft.³. The compact measured 0.55 cm. thick, 3.2 cm. wide, and 9.9 cm. long. The thickness (0.55 cm.) was parallel to the axis of the compression vector.

The compact was soaked in a 50/50 volume ratio mixture of concentrated HNO₃ and concentrated H₂SO₄ at room temperature for about 5 minutes.

The so-treated compact was heated to about 350° C. and within a few minutes it swelled along the axis of compression to a thickness of 1.75 cm. The swelled compact had an apparent bulk density of 13.5 lbs./ft.³.

I claim:

1. A process for preparing relatively low density graphite structures having low thermal conductivities which comprises compressing vermicular graphite to form a graphite compact having a density of at least 40 lbs./ft.³, treating said compact with an intercalating agent, and heating said treated compact to a temperature of between about 100° C. and about 500° C. to cause expansion thereof along the axis of compression to produce a graphite structure having a density of between about 5 and 25 lbs./ft.³.

2. The process of claim 1 wherein the density of the graphite compact is at least 60 lbs./ft.³.

3. The process of claim 1 wherein the treated compact is heated to a temperature of between about 200° C. and about 400° C.

4. The process of claim 1 wherein the intercalating agent is fuming nitric acid.

5. The process of claim 1 wherein the intercalating agent is fuming sulfuric acid.

6. The process of claim 1 wherein the intercalating agent is liquid bromine.

7. The process of claim 1 wherein the intercalating agent is HClO₄.

8. The process of claim 1 wherein the intercalating agent is a mixture of concentrated nitric acid and concentrated sulfuric acid.

References Cited

UNITED STATES PATENTS

| 1,137,373 | 4/1915 | Aylsworth | 23—209.1 X |
| 1,191,383 | 7/1916 | Aylsworth | 23—209.1 X |
| 3,323,869 | 7/1967 | Olstowski | 23—209.1 |

EDWARD J. MEROS, *Primary Examiner.*